United States Patent
Gottzmann et al.

(10) Patent No.: US 6,537,465 B2
(45) Date of Patent: Mar. 25, 2003

(54) LOW PRESSURE STEAM PURGED CHEMICAL REACTOR INCLUDING AN OXYGEN TRANSPORT MEMBRANE

(75) Inventors: Christian Friedrich Gottzmann, Clarence, NY (US); Ravi Prasad, East Amherst, NY (US); Joseph Michael Schwartz, Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 125 days.

(21) Appl. No.: 09/750,082

(22) Filed: Dec. 29, 2000

(65) Prior Publication Data

US 2002/0127177 A1 Sep. 12, 2002

(51) Int. Cl.$^7$ ............................. B01D 53/22; C01B 3/24
(52) U.S. Cl. ............................................ 252/373; 95/54
(58) Field of Search ............................... 252/373; 95/54

(56) References Cited

U.S. PATENT DOCUMENTS

| | | | | |
|---|---|---|---|---|
| 5,160,713 A | * | 11/1992 | Mazanec et al. | 252/373 |
| 6,048,472 A | * | 4/2000 | Nataraj et al. | 252/373 |
| 6,066,307 A | * | 5/2000 | Keskar et al. | 252/373 |
| 6,077,323 A | * | 6/2000 | Nataraj et al. | 252/373 |
| 6,110,979 A | * | 8/2000 | Nataraj et al. | 252/373 |
| 6,143,203 A | * | 11/2000 | Zeng et al. | 252/373 |
| 6,153,163 A | * | 11/2000 | Prasad et al. | 252/373 |
| 6,338,833 B1 | * | 1/2002 | Aasberg-Petersen | 252/373 |
| 6,379,586 B1 | * | 4/2002 | Zeng et al. | 252/373 |
| 6,402,988 B1 | * | 6/2002 | Gottzmann et al. | 252/373 |

* cited by examiner

Primary Examiner—Wayne A. Langel
(74) Attorney, Agent, or Firm—David M. Rosenblum (57) ABSTRACT

Methane is formed into synthesis gas through a combination of a partial oxidation reaction and a steam reforming reaction. Oxygen for the partial oxidation reaction is obtained by contacting air with an oxygen transport membrane and recovering the oxygen transported through the membrane. To increase the oxygen flux through the membrane, steam is utilized as a sweep gas on the anode side of the membrane. The steam reduces the oxygen partial pressure on the anode side increasing the flux. The efficiency and cost benefit of the process is enhanced by utilizing in-line combustors to heat gases being delivered to the oxygen transport membrane. Membrane integrity is enhanced by conducting the reactions in a reactor that is remote from the oxygen transport membrane.

38 Claims, 6 Drawing Sheets

LOW PRESSURE STEAM PURGED CHEMICAL REACTOR INCLUDING AN OXYGEN TRANSPORT MEMBRANE

FIELD OF THE INVENTION

This invention relates to a process that facilitates the generation of syngas and/or hydrogen in a chemical reactor that includes an oxygen transport membrane. More particularly, the structural designs of the membrane and of a reactor housing that membrane are simplified by purging the anode side of the oxygen transport membrane with steam thereby reducing the pressure differential from the cathode side to the anode side of the oxygen transport membrane. Further benefits of the process are achieved by conducting a methane steam reforming reaction and a direct partial oxidation of methane reaction in a single reaction vessel that is separated from the oxygen transport membrane.

BACKGROUND OF THE INVENTION

Oil and petrochemical companies have discovered vast quantities of natural gas in remote locations such as in polar regions and under seas. While the natural gas provides an inexpensive source of energy such as for the generation of steam, transport of the natural gas, which consists mostly of methane, is difficult. Typically, the methane is converted to synthesis gas (syngas), an intermediate in the conversion of natural gas to liquid fuels that are much more readily transported. Syngas is a mixture of hydrogen and carbon monoxide with an $H_2/CO$ molar ratio of from about 0.6 to about 6.

Reactions useful for the conversion of methane to syngas include a methane steam reforming process and a direct partial oxidation of methane. The methane steam reforming reaction:

$$CH_4 + H_2O \rightarrow CO + 3H_2$$

Is an endothermic reaction having a relatively high yield of hydrogen gas ($H_2$), producing three moles of hydrogen gas for each mole of carbon monoxide produced. The reaction kinetics require the addition of significant amounts of heat.

The direct partial oxidation of methane:

$$CH_4 + 2O_2 \rightarrow CO + 2H_2$$

is exothermic and generates two moles of hydrogen for each mole of carbon monoxide produced. The direct partial oxidation reaction further requires a source of oxygen. Air is generally an inefficient source of oxygen for the direct partial oxidation reaction because the high percentage of nitrogen contained within air acts as a diluent, significantly reducing the efficiency of the reaction and requiring subsequent separation from the synthesis gas product.

One source of oxygen for the direct partial oxidation reaction is through the use of an ionic or mixed conducting membrane reactor. A solid electrolyte membrane that has oxygen selectivity is disposed between an oxygen containing feed stream and an oxygen consuming, typically methane-containing product stream. "Oxygen selectivity" means that oxygen ions are transported across the membrane while other elements, and ions thereof, are not. The solid electrolyte membrane is typically made from inorganic oxides, typified by calcium- or yttrium-stabilized zirconia and analogous oxides, often having a fluorite or a perovskite structure.

At elevated temperatures, typically in excess of 500° C., and preferably in the range of 700° C.–1200° C., the solid electrolyte membranes contain mobile oxygen ion vacancies that provide conduction sites for the selective transport of oxygen ions through the material. Because the membranes allow only oxygen transport, they function as a membrane with infinite selectivity for oxygen and are therefore very attractive for use in air separation processes.

Recognizing that the methane steam reforming reaction is endothermic and that the direct partial oxidation of methane reaction is exothermic, it would be attractive to combine the two reactions in a single reaction vessel. Combining the reactions adjacent to the oxygen transport membrane leads to a number of problems. The ceramic membranes are subject to steam corrosion and tend to lose oxygen from their lattice structure at the low partial oxygen pressures at the anode. High levels of stress are generated by differential compositional expansion in the membrane at the steep oxygen gradients across the membrane. The membrane can also become coated with coke and carbon reducing the effective transport of oxygen. It is also necessary to manage the heats of reaction to avoid hot spots along the membrane surface and to seal the membrane elements against high pressure differentials.

An alternate approach is to separate the oxygen separation membrane from the syngas generating reactions and to transport separated oxygen from the anode side of the oxygen transport membrane to a separate reactor for transacting the syngas generating reactions. A dual reactor approach avoids many of the problems mentioned above, however, a process that is less capital intensive is required.

U.S. Pat. No. 5,035,726 discloses the separation of argon from air utilizing an oxygen transport membrane to remove oxygen from the air. A subsequent distillation removes the nitrogen. To decrease the oxygen partial pressure on the anode side of the oxygen transport membrane, a sweep gas is employed. Waste nitrogen from distillation may be heated and utilized as the sweep gas.

U.S. Pat. No. 5,562,754 discloses an oxygen transport membrane employing a sweep gas on the anode side. The sweep gas may be steam at a temperature of between 800° F. and 2000° F. and at a pressure of between 2 psia and 300 psia. The steam is formed by heating boiler feed water in a combustor.

U.S. Pat. No. 5,964,922 discloses the use of steam as a purge gas on the anode side of an oxygen transport membrane. A mixture of steam and oxygen is injected into a reaction vessel remote from the oxygen transport membrane and utilized for coal gasification.

U.S. Pat. Nos. 5,035,726, 5,562,754 and 5,964,922 are each incorporated by reference in their entireties herein.

There remains, however, a need for a process to combine oxygen separation by a high temperature membrane with a syngas and/or hydrogen generating reactor that utilizes both an endothermic steam reforming reaction and an exothermic partial oxidation reaction in which the combination of reactions does not detrimentally affect the structural integrity of the oxygen transport membrane. There is further a need for a reactor to support the combination of reactions that is not capital intensive.

SUMMARY OF THE INVENTION

In accordance with a first preferred embodiment of the invention, a process to separate oxygen from an oxygen containing feed gas includes two in-line combustors.

In one aspect of the process, the process includes the following steps: (1) providing a first reactor housing an oxygen transport membrane that has a cathode side and an opposing anode side. This oxygen transport membrane is at a temperature that is effective to enable the transport of oxygen ions from the cathode side to the anode side. (2) Heating the oxygen containing feed gas in a first combustor and by recuperative heat exchange and then contacting the cathode side of the oxygen transport membrane with the heated oxygen containing feed gas. The oxygen containing feed gas having been compressed to a pressure of from 20 psia to 100 psia. (3) Heating a sweep gas that is, volumetrically, or on a molar basis, predominantly steam and has a steam pressure of from 10 psia to 30 psia and then contacting the anode side of the oxygen transport membrane with the heated sweep gas. Preferentially the sweep steam is generated by waste heat from the reaction process. (4) Recovering as anode effluent a mixture of transported oxygen and steam from the first reactor wherein the heated sweep gas volume is regulated to maintain an anode effluent with a steam to oxygen molar ratio that is in excess of 1:1. (5) Condensing and separating out steam contained in the anode effluent and compressing the resultant oxygen stream to partial oxidation or autothermal reactor pressure. (6) Heating the compressed oxygen gas and feeding it to the partial oxidation reactor or autothermal reformer.

In a first preferred aspect of this first embodiment, the process includes pre-heating the oxygen containing feed gas in a recuperative heat exchanger to a temperature that is within 100° C. to 200° C. of an intended temperature of the oxygen containing feed gas when exiting the first combustor. A typical intended temperature is between 800° C. and 1000° C. This first combustor may be fired with a mixture of a fuel and a minor portion of oxygen from the oxygen containing feed gas. In similar fashion, a portion of oxygen from the anode effluent may be mixed with a fuel and combusted in the second combustor to heat the sweep gas.

In a second preferred aspect of this first embodiment, both the first combustor and the second combustor are housed within the first reactor.

In a third preferred aspect of this first embodiment, the sweep steam is generated by using the latent heat of condensation of the steam contained in the reactor output stream and the available sensible heat in the resulting steam condensate.

In a fourth preferred aspect of this first embodiment, the reacting step in the second reactor includes both partial oxidation and steam reforming. One suitable second reactor is an auto-thermal reformer.

In accordance with a second embodiment of the invention the compressed air stream and the sweep steam are indirectly heated to membrane reactor operating temperature in a fired heater where the oxygen for the combustion is taken from the residual heat contained in the retentate stream effluent from the cathode side of the membrane reactor.

In accordance with a third embodiment of the invention, the sweep steam is taken from the exhaust of a steam turbine, the preferred inlet conditions for which are selected to enable the steam turbine to at least drive one of the air compressor or the oxygen compressor.

In a first preferred aspect of this third embodiment, the oxygen containing feed gas is heated in a first combustor and the sweep gas in a second combustor before contacting the oxygen containing feed gas and the sweep gas with the oxygen transport membrane. The first combustor may be fired with a mixture of a fuel and oxygen from the oxygen containing feed gas and the second combustor with a mixture of a minor portion of the oxygen from the anode effluent and a fuel.

In a second preferred aspect of this third embodiment, both the first combustor and the second combustor are housed within the first reactor.

In a third preferred aspect of this third embodiment, the steam for driving the steam turbine is generated by at least a portion of the sensible heat contained in the second reactor effluent.

BRIEF DESCRIPTION OF THE DRAWINGS

Other objects, features and advantages will occur to those skilled in the art from the following description of preferred embodiments and accompanying drawings in which.

DETAILED DESCRIPTION

Figure 1:
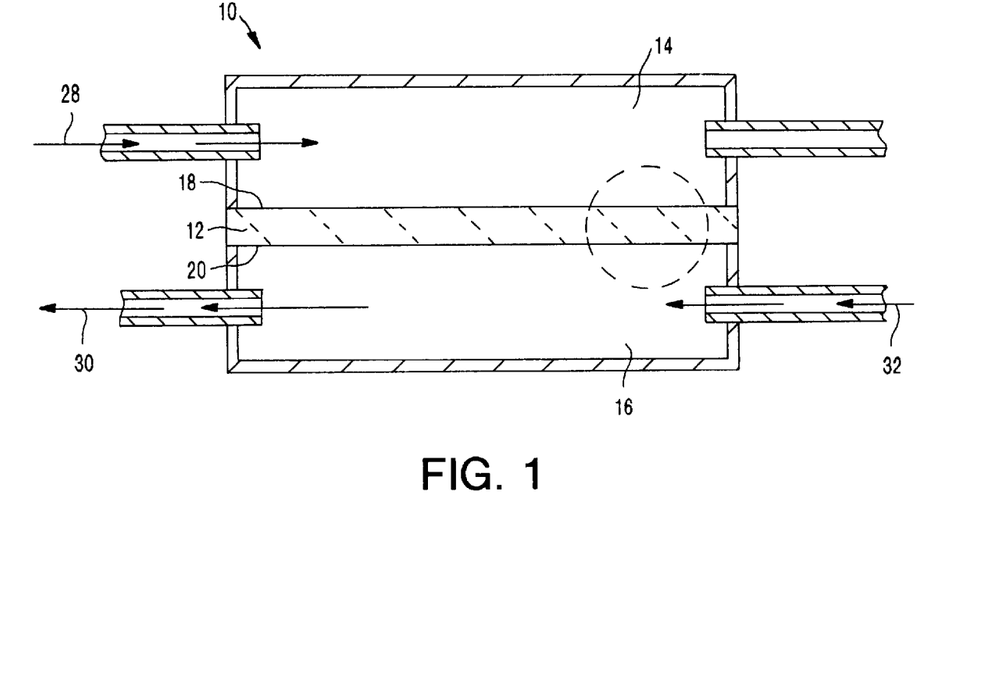
FIG. 1 illustrates in cross-sectional representation a chemical reactor useful to separate oxygen from an oxygen containing feed gas in accordance with the invention.

FIG. 1 illustrates in cross-sectional representation a chemical reactor 10 useful to separate oxygen from an oxygen containing feed gas in accordance with the invention. An oxygen transport membrane 12 hermetically separates the interior of the chemical reactor into a first section 14 and a second section 16. A cathode side 18 of the oxygen transport membrane 12 forms a surface of the first section 14 while an opposing anode side 20 forms a surface of the second section 16. The oxygen transport membrane 12 is formed from any material effective to selectively transport oxygen ions from the cathode side 18 to the anode side 20 at an effective temperature, typically on the order of 450° C.–1100° C., when a positive differential of oxygen partial pressures between the cathode side and the anode side is established.

The oxygen selective ion transport membrane 12 is typically formed from inorganic oxides, such as mixed metal oxides having oxygen ion and electron conductivity at operating temperature, or multi-phase mixtures of metal oxides having ion or mixed conductivity and metals or oxides having electron conductivity. When a self-supporting structure, as illustrated in FIG. 1, the oxygen selective ion transport membrane 12 has a nominal thickness of under 5000 microns and is preferably less than 1000 microns thick. The membrane element has the ability to transport oxygen ions and electrons in the temperature range of from 450° C. to about 1200° C. when an oxygen chemical potential difference is maintained across the ion transport membrane surface caused by maintaining a positive ratio of oxygen partial pressures across the ion transport membrane. This positive ratio is preferably enhanced or achieved by sweeping the second section 16 with steam. The oxygen ion conductivity is typically in the range of between 0.01 and 100 S/cm where S is reciprocal ohms (1/ohms).

Suitable materials for the ion transport membrane include perovskites and dual phase metal-metal oxide combinations as listed in Table 1.

Optionally, a porous catalyst layer, possibly made from the same perovskite material, may be added to one or both sides of the oxygen-transport membrane element to enhance oxygen surface exchange and the chemical reactions on the surfaces. Alternatively, the surface layers of the oxygen-selective ion transport membrane element may be doped, for example, with cobalt, to enhance surface exchange kinetics.

TABLE I

Mixed Conducting Solid Electrolytes

Material Composition

Figure 2:
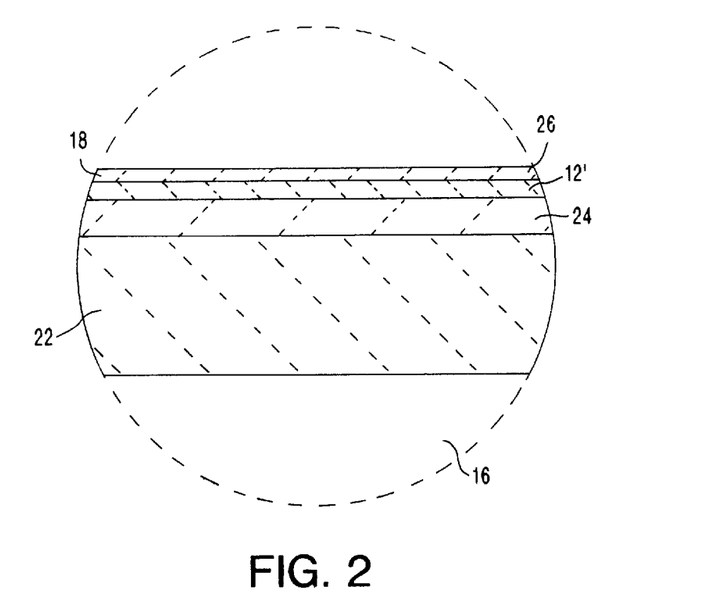
FIG. 2 illustrates in cross-sectional representation a composite oxygen transport membrane useful with the chemical reactor of FIG. 1.

1. $(La_{1-x}Sr_x)(Co_{1-y}Fe_y)O_{3-\delta}$ ($0 \leq x \leq 1$, $0 \leq y \leq 1$, $\delta$ from stoichiometry)
2. $SrMnO_{3-\delta}$ ($\delta$ from stoichiometry)
   $SrMn_{1-y}Co_yO_{3-\delta}$ ($0 \leq y \leq 1$, $\delta$ from stoichiometry)
   $Sr_{1-x}Na_xMnO_{3-\delta}$ ($0 \leq x \leq 1$, $\delta$ from stoichiometry)
3. $BaFe_{0.5}Co_{0.5}YO_3$
   $SrCeO_3$
   $YBa_2Cu_3O_{7-\delta}$ ($0 \leq \delta \leq 1$, $\delta$ from stoichiometry)
4. $La_{0.2}Ba_{0.8}Co_{0.8}Fe_{0.2}O_{2.6}$; $Pr_{0.2}Ba_{0.8}Co_{0.8}Fe_{0.2}O_{2.6}$
5. $A_xA'_{x'}A''_{x''}B_yB'_{y'}B''_{y''}O_{3-\delta}$ ($x,x',x'',y,y',y''$ all in 0–1 range)
   Where: A, A', A" = from groups 1, 2, 3 and f-block lanthanides
   B, B', B" = from d-block transition metals
   $\delta$ from stoichiometry
6. (a) Co—La—Bi type:  Cobalt oxide  15–75 mole %
      Lanthanum oxide  13–45 mole %
      Bismuth oxide  17–50 mole %
   (b) Co—Sr—Ce type:  Cobalt oxide  15–40 mole %
      Strontium oxide  40–55 mole %
      Cerium oxide  15–40 mole %
   (c) Co—Sr—Bi type:  Cobalt oxide  10–40 mole %
      Strontium oxide  5–50 mole %
      Bismuth oxide  35–70 mole %
   (d) Co—La—Ce type:  Cobalt oxide  10–40 mole %
      Lanthanum oxide  10–40 mole %
      Cerium oxide  30–70 mole %
   (e) Co—La—Sr—Bi type:  Cobalt oxide  15–70 mole %
      Lanthanum oxide  1–40 mole %
      Strontium oxide  1–40 mole %
      Bismuth oxide  25–50 mole %
   (f) Co—La—Sr—Ce type:  Cobalt oxide  10–40 mole %
      Lanthanum oxide  1–35 mole %
      Strontium oxide  1–35 mole %
      Cerium oxide  30–70 mole %
7. $Bi_{2-x-y}M'_xM_yO_{3-\delta}$ ($0 \leq x \leq 1$, $0 \leq y \leq 1$, $\delta$ from stoichiometry)
   where: M' = Er, Y, Tm, Yb, Tb, Lu, Nd, Sm, Dy, Sr, Hf, Th, Ta, Nb, Pb,
   Sn, In, Ca, Sr, La and mixtures thereof
   M = Mn Fe, Co, Ni, Cu and mixtures thereof
8. $BaCe_{1-x}Gd_xO_{3-x/2}$ where, x equals from zero to about 1.
9. One of the materials of $A_sA'_tB_uB'_vB''_wO_x$ family whose composition is disclosed in U.S. Pat. 5,306,411 (Mazanec et al.) as follows:
   A represents a lanthanide or Y, or a mixture thereof;
   A' represents an alkaline earth metal or a mixture thereof;
   B represents Fe;
   B' represents Cr or Ti, or a mixture thereof;
   B" represents Mn, Co, V, Ni or Cu, or a mixture thereof;
   and s, t, u, v, w, and x are numbers such that:
   s/t equals from about 0.01 to about 100;
   u equals from about 0.01 to about 1;
   v equals from zero to about 1;
   w equals from zero to about 1;
   x equals a number that satisfies the valences of the A, A', B, B',
   B" in the formula; and $0.9 < (s + t)/(u + v + w) < 1.1$
10. One of the materials of $La_{1-x}Sr_xCu_{1-y}M_yO_{3-\delta}$ family, where:
    M represents Fe or Co;
    x equals from zero to about 1;
    y equals from zero to about 1;
    $\delta$ equals a number that satisfies the valences of La, Sr, Cu, and M in the formula TABLE I-continued Mixed Conducting Solid Electrolytes Material Composition 11. One of the materials of $Ce_{1-x}A_xO_{2-\delta}$ family, where:
    A represents a lanthanide, Ru, or Y; or a mixture thereof;
    x equals from zero to about 1;
    $\delta$ equals a number that satisfies the valences of Ce and A in the formula
12. One of the materials of $Sr_{1-x}Bi_xFeO_{3-\delta}$ family, where:
    A represents a lanthanide, or Y, or a mixture thereof;
    x equals from zero to about 1;
    $\delta$ equals a number that satisfies the valences of Ce and A in the formula
13. One of the materials of $Sr_xFe_yCo_zO_{3-\delta}$ family, where:
    x equals from zero to about 1;
    y equals from zero to about 1;
    $\delta$ equals a number that satisfies the valences of Sr, Bi and Fe in the formula
14. Dual phase mixed conductors (electronic/ionic):
    $(Pd)_{0.5}/(YSZ)_{0.5}$
    $(Pt)_{0.5}/(YSZ)_{0.5}$
    $(LaCr_{1-y}Mg_yO_{3-\delta})_{0.5}(YSZ)_{0.5}$
    $(In_{90\%}Pt_{10\%})_{0.6}/(YSZ)_{0.5}$
    $(In_{90\%}Pt_{10\%})_{0.5}/(YSZ)_{0.5}$
    $(In_{95\%}Pr_{2.5\%}Zr_{2.5\%})_{0.5}/(YSZ)_{0.5}$
    Any of the materials described in 1–13, to which a high temperature metallic phase (e.g, Pd, Pt, Ag, Au, Ti, Ta, W) is added The oxygen transport membrane 12 may be a self-supporting monolithic layer having a typical thickness of between 1000 microns and 5000 microns, or, preferably, is a composite structure as illustrated in FIG. 2. A porous support structure 22 is formed from a material, typically ceramic, that is not degraded by the temperature and chemical environment of second section 16. Suitable materials for the porous support structure may be the same material used in the dense membrane layer, ceria or zirconia. The porous support structure has a network of interconnected pores that facilitates the relatively unimpeded transport of gaseous materials through the structure.

The oxygen transport membrane 12' is relatively thin, on the order from 5 to 100 microns thick, and made up of a mixture of ion conducting and electron conducting metallic oxides or a two phase mixture of ion conducting metallic oxides and a second electron conducting phase. The supported membrane 12$^1$ may be considerably thinner than a self-supporting oxygen transport membrane and, since the flux is proportional to the log of the ratio of oxygen, it facilitates higher oxygen flux (rate of oxygen ion transport).

A first surface exchange enhancement layer 24 is disposed between the porous support structure 22 and supported oxygen transport membrane 12$^1$. This layer enhances surface exchange and bridges chemical and mechanical compatibility between the two components. Preferably, surface exchange enhancement layer 24 is formed from the same material that forms the supported oxygen transport membrane 12 but as a porous, rather than dense, structure.

A second surface exchange enhancement layer 26 made from the same material may be deposited on cathode side 18.

Due to the low pressures required for operation of the reactor of the invention, the porous support structure 22 may be relatively thin, on the order of 500 to 1000 microns as compared to a typical thickness of on the order of 1000 to 2000 microns for a reactor combining oxygen separation and syngas generation.

With reference back to FIG. 1, an oxygen containing feed gas 28, typically air is compressed to a pressure of from about 20 psia to about 100 psia, and then heated to an effective operating temperature, on the order of 800° C.–1000° C., and delivered to the first section 14 of chemical reactor 10 where the oxygen containing feed gas contacts cathode side 18. A portion of the oxygen contained within the oxygen containing feed gas 28 is transported through the oxygen transport membrane and recovered as product gas 30. While FIG. 1 illustrates the preferred countercurrent flow on opposing sides of oxygen transport membrane 12, other flow patterns such as concurrent flow or crosscurrent flow may also be used.

The transport of oxygen through the oxygen transport membrane 12 is driven by the oxygen partial pressure ratio between the cathode side 18 and the anode side 20. To increase this oxygen partial pressure ratio or establish a positive ratio, a sweep gas 32 is delivered to the second section 16. Sweep gas 32 is selected to be non-reactive with oxygen and with the material making up the oxygen transport membrane. The sweep gas is preferentially steam. The steam has a partial pressure of between about 8 psia and about 24 psia in the anode effluent.

Product gas 30 is a mixture of transported oxygen and steam. The oxygen product may then be separated from the steam by condensing the steam and removing it in a steam separator.

To obtain a high oxygen flux at a moderate air feed pressure, the molar ratio of steam to oxygen in second section 16 is greater than 1. More preferably, the molar ratio is in excess of 2 and, when significant waste heat is available, most preferably in excess of about 3.

Figure 3:
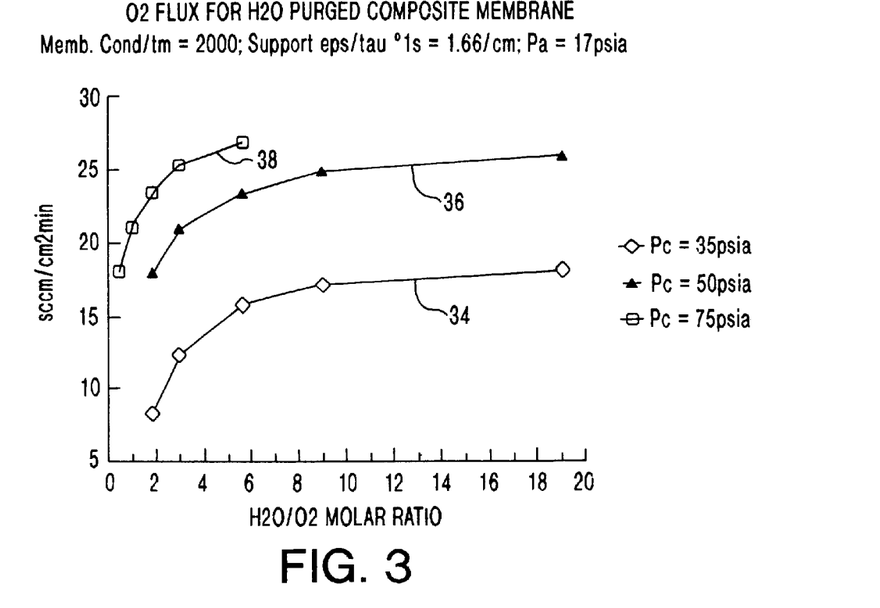
FIG. 3 graphically illustrates the oxygen flux rate as a function of the sweep gas to oxygen molar ratio.

FIG. 3 graphically illustrates the benefit of a high steam to oxygen molar ratio. The total pressure in the second section (16 in FIG. 1) was held at 17 psia and the air pressure in the first section (14 in FIG. 1) set at 35 psia (reference line 34), 50 psia (reference line 36) and 75 psia (reference line 38). FIG. 3 confirms the desirability of maintaining the molar ratio at above 1

Figure 4:
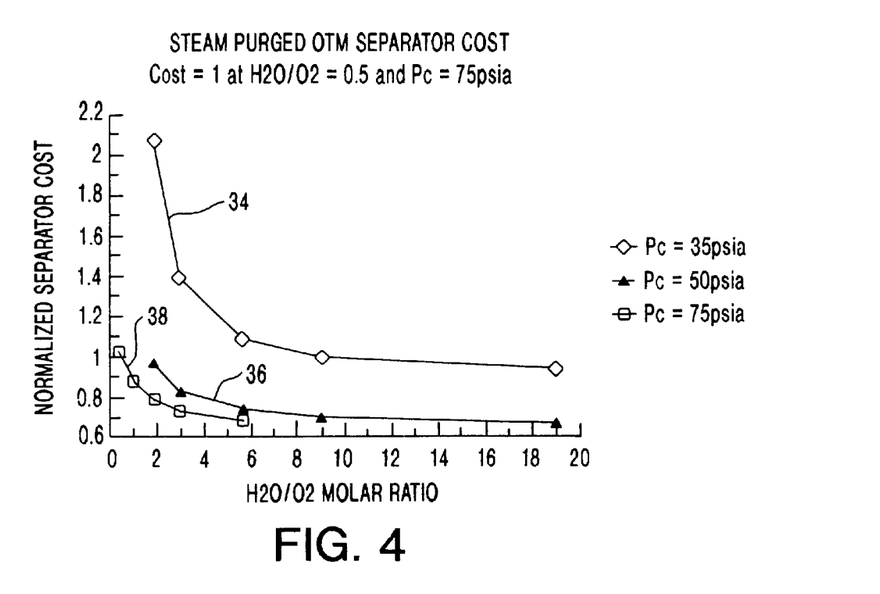
FIG. 4 graphically illustrates how the cost of oxygen product gas is reduced as the sweep gas to oxygen molar ratio is increased.

FIG. 4 graphically illustrates how the cost for oxygen as a product is reduced as the molar ratio increases. In FIG. 4, a normalized value of 1 represents a typical cost of oxygen at a conventional molar ratio of 0.5. The lower cost of the oxygen produced in accordance with the invention is related to lower operating pressures, the absence of a reactive environment, optionally lower operating temperatures, the absence of a reactive environment and the ability to select higher conductivity materials for the oxygen transport membrane as compared to the case of an oxygen membrane syngas reactor. For example the (lanthanum-strontium)-(cobalt-iron) oxide containing materials of Table 1 may be chosen in place of the chromium containing oxides required by a typical syngas reactor.

Figure 5:
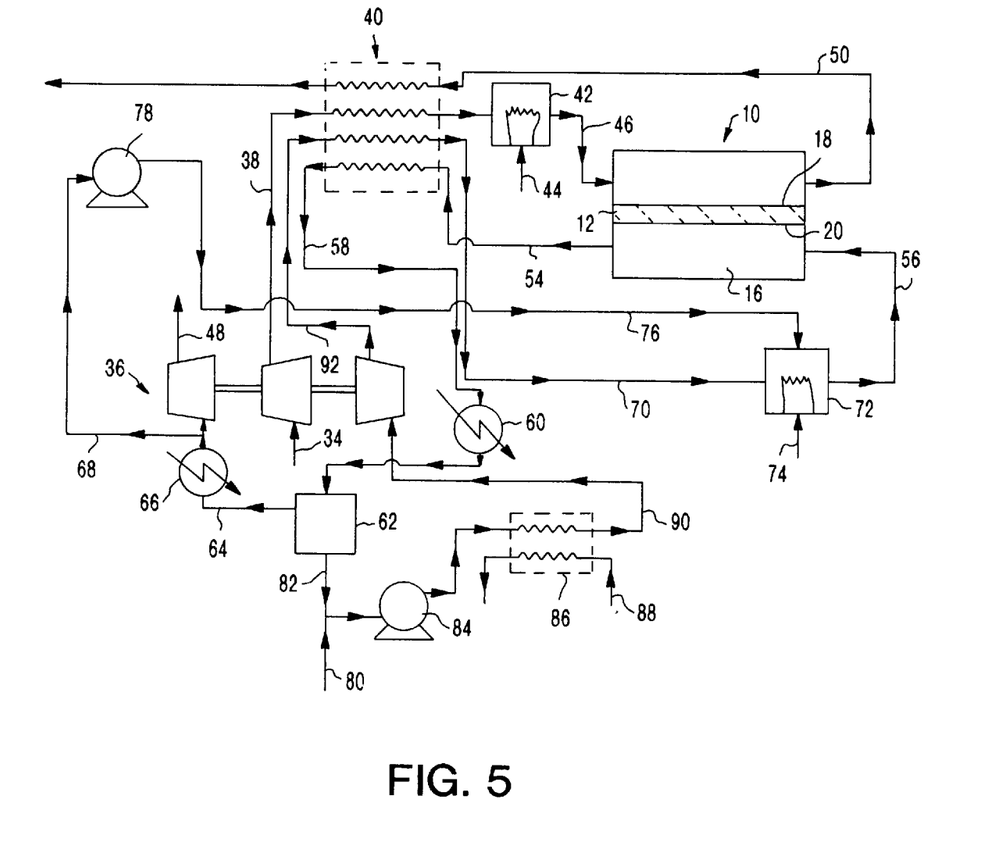
FIG. 5 is a process flow diagram in accordance with a first embodiment of the invention.

FIG. 5 schematically illustrates a process for applying the instant invention utilizing a pair of in line combustors 42,72. Air 28 is compressed to a pressure of between 20 psia and 100 psia and preferably, to a pressure of between 35 psia and 55 psia. Typically, installations embodying the process of the instant invention are installed at remote locations where natural gas is converted to syngas and other liquid products to facilitate transportation. At these locations, energy has a low value and large volumes of low pressure steam can be generated by available waste heat from resident processes or burning of natural gas at low cost.

Compressed air 38 is heated in recuperative heat exchanger 40 to a temperature of about 650° C.–850° C. and then further heated in combustor 42 to a temperature of at least 800° C. and preferably to a temperature of between 900° C. and 950° C. Preferably, recuperative heat exchanger 40 raises the temperature of the compressed air 38 to close to the operating temperature. Typically, recuperative heat exchanger 40 heats the compressed air to within 100° C. of the operating temperature and preferably to within 50° C. of the operating temperature. Combustor 42 is fired by a combination of fuel 44 and oxygen contained within compressed air 38. Since that oxygen is a desired product, the process is intended to minimize the amount of oxygen consumed in combustor 42 since the reduction in oxygen content detracts from the driving force available for oxygen transfer across the oxygen transport membrane.

Heated and compressed air 46 contacts the cathode side 18 of oxygen transport membrane 12. A portion of the oxygen contained within heated and compressed air 46 is transported to anode side 20 for subsequent recovery as oxygen product gas 48. Heated and compressed retentate gas 50 that is the oxygen depleted component of the compressed air is cooled in recuperative heat exchanger 40 and then either recovered as a high nitrogen content gas 52 or discharged as waste.

Anode effluent gas 54 is a mixture of the oxygen transported through oxygen transport membrane 12 and an inert sweep gas 56 that is preferentially steam. Anode effluent gas 54 is cooled in recuperative heat exchanger 40 to a temperature of about 100° C. to 250° C. forming an anode effluent gas containing steam 58. Contained steam is condensed, typically against cooling water or cooling air in condenser 60 and the resulting water is removed from the anode effluent gas by separator 62. A low pressure oxygen stream 64 is recovered from separator 62 and further cooled in cooler 66. A small portion 68, of the low pressure oxygen stream with moisture is withdrawn and the remainder compressed to above syngas reactor pressure of about 100 to 600 psia forming oxygen gas stream 48 that is then ready for introduction into a standard design autothermal reactor or other oxidation reactor, typically after some pre-heating in a process cycle.

Sweep gas 56 reduces the oxygen partial pressure in the anode section 16 of the reactor 10. The sweep gas 56 is selected to be substantially non-reactive with oxygen transported through the oxygen transport membrane. In preferred embodiments, sweep gas 56 is essentially all steam. Steam is generated in waste heat boiler 86 from recirculated water 82 and make-up water 80 which streams are pumped to the required pressure by water pump 84. A preferred source of heat for raising steam is the latent heat of condensation and available sensible heat in the condensate of the steam contained in the syngas product stream 88. The contained steam would be condensed in the waste heat boiler and the resultant liquid water-gas mixture separated into condensate and product gas (not shown). The recovered condensate would be recycled to the process. The steam 92 is recuperatively heated in heat exchanger 40 to an intermediate temperature. The resulting stream 70 is heated to membrane operating temperature in combustor 72 by reaction of fuel 74 and oxygen 76 injected directly into the steam. The effluent 56 from combustor 72 consisting primarily of steam and small amounts of carbon dioxide is introduced into membrane reactor 10 where it traverses the anode side 16 as a sweep gas, preferably in a direction countercurrent or crosscountercurrent to the flow on the cathode side 18. The exiting stream 54 contains steam, oxygen and small amounts of carbon dioxide. It is cooled in heat exchanger 40 and then enters condenser 60 as stream 58. The oxygen required by combustor 72 is obtained by raising the pressure of stream 68 in blower 78 to overcome circuit pressure drop.

The use of in-line combustors 42, 72 avoids the requirement of capital intensive high temperature heat exchangers at the expense of a small reduction in the overall oxygen recovery of the separation process.

Figure 6:
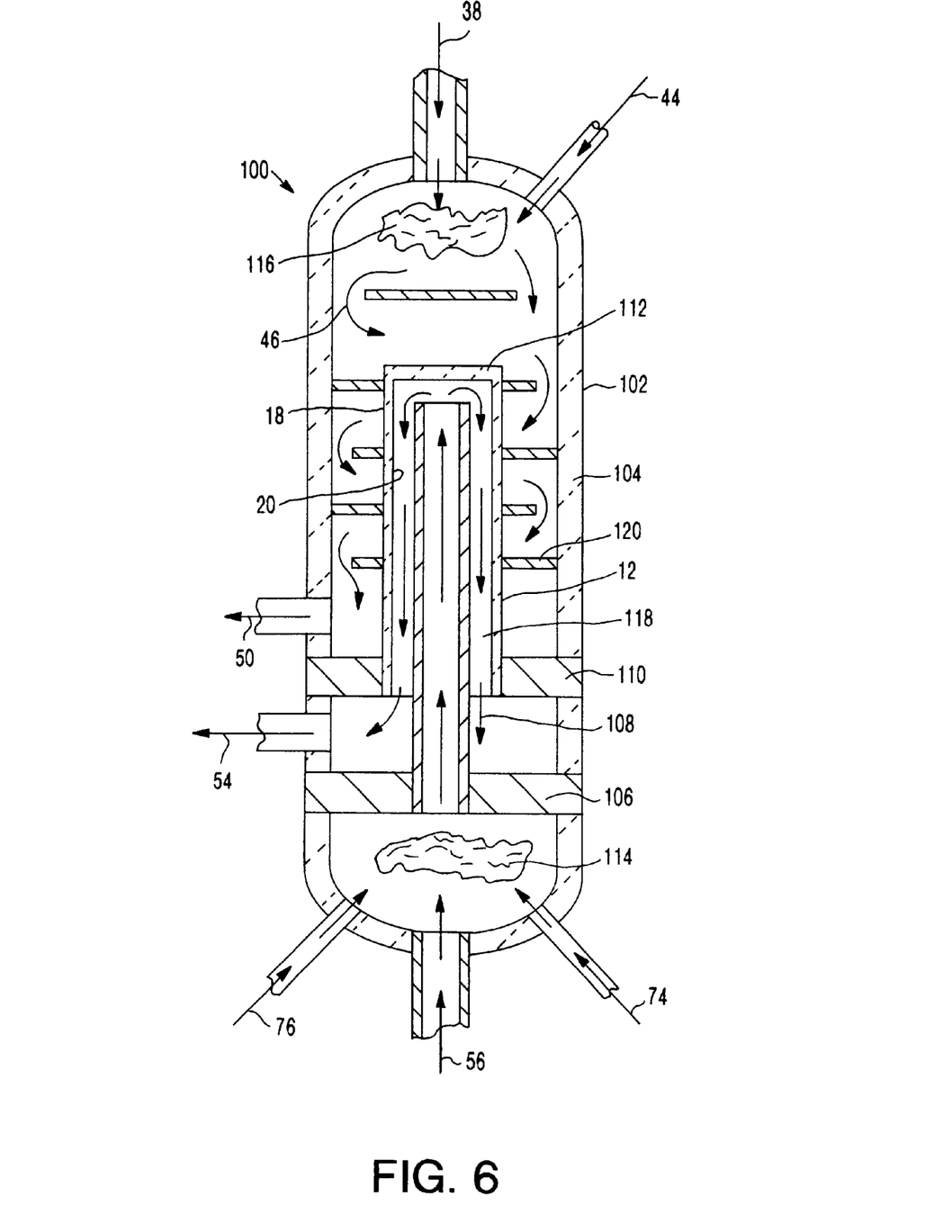
FIG. 6 illustrates in cross-sectional representation a chemical reactor having combustors integrated with the oxygen transport membrane.

Optionally the combustors can be integrated into the membrane reactor assembly as shown in FIG. 6. Integrated reactor 100 typically has a steel wall 102 coated with internal insulation 104 to define an internal reaction vessel. A first tube sheet 106 supports a gas impervious tube 108 formed from stainless steel or a similar material. A second tube sheet 110 supports a first end of a tubular oxygen transport membrane 12. The opposing second end of the oxygen transport membrane is a closed tube end 112 that is free floating to avoid axial stresses from differential thermal and compositional expansions. Sweep gas 56 is heated in a first combustion space 114 by a reaction of fuel 74 and injected oxygen 76. Compressed air 38 is heated in second combustion space 116 that is reaction of fuel 44 and a minor portion of oxygen contained within compressed air 38. The heated sweep gas flows through the gas impervious tube 108 and then through an annulus 118 defined by an outer wall of the gas impervious tube 108 and the anode side 20 of the oxygen transport membrane 12. Heated and compressed air 46 flows around baffles 120 and contacts the cathode side 18 of oxygen transport membrane 12. Oxygen is transported through the oxygen transport membrane 12 and subsequently recovered from anode effluent gas 54. Retentate gas 50 may either be used as a source of nitrogen or disposed as waste.

Figure 7:
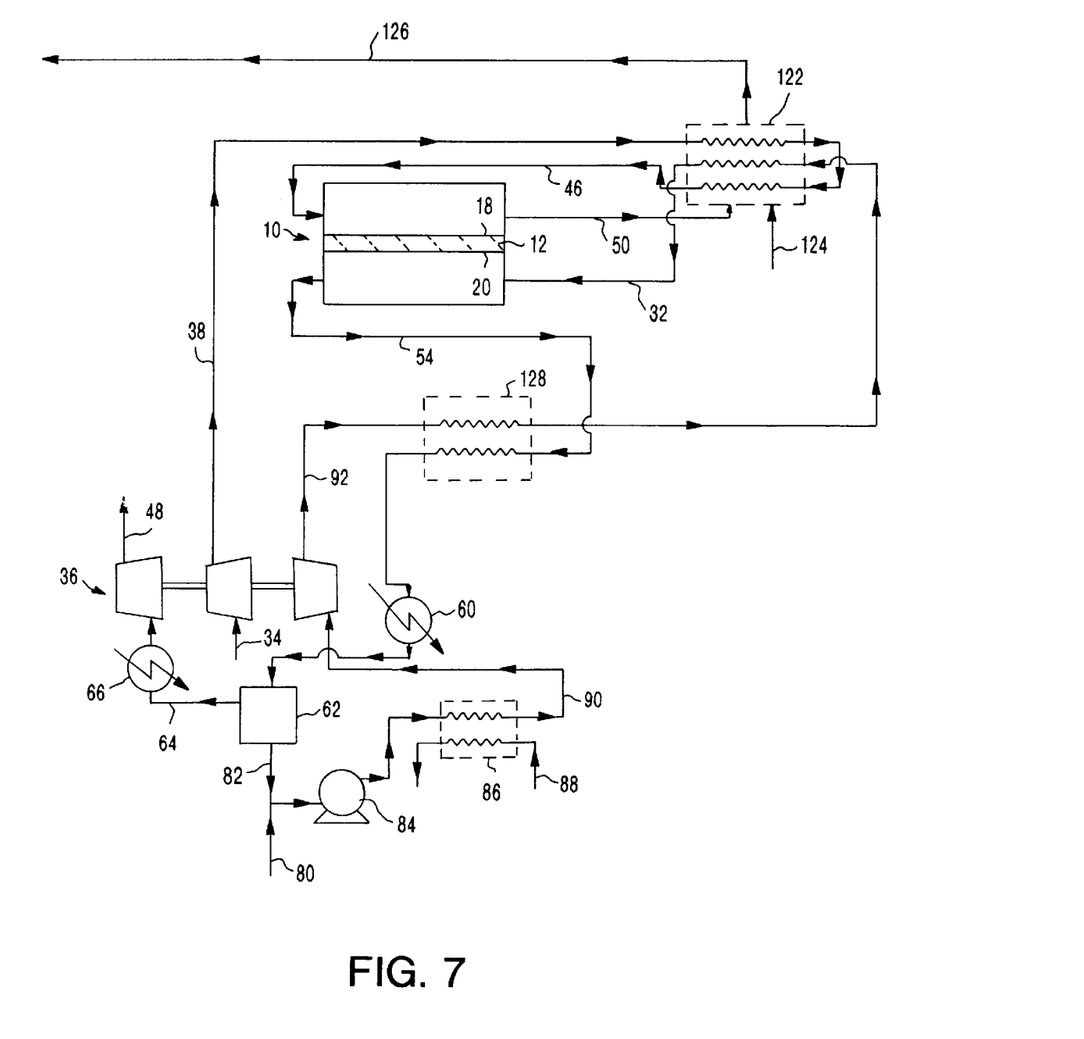
FIG. 7 is a process flow diagram in accordance with a second embodiment of the invention.

FIG. 7 illustrates a system that eliminates the need for an in-line combustor and avoids the reduction of the oxygen content of feed air prior to delivery of that feed air to oxygen separator 10. Therefore, the effective oxygen recovery can be increased. A number of the components of the system illustrated in FIG. 7 are identical to those illustrated and described with reference to FIG. 5. Such structures are supplied with like reference numerals and not described in detail with reference to FIG. 7.

Compressed air 38 is heated to an operating temperature of at least 850° C., and preferably from about 900° C. to about 950° C. in fired heater 122. Heated and compressed air 46 is delivered to the chemical reactor 10 where a portion of the oxygen contained within the heated and compressed air is transported from the cathode side 18 to the anode side 20 of an oxygen transport membrane 12. Retentate gas 50 having an oxygen content of between 4% and 10%, by moles, is combined with fuel 124 supporting combustion within fired heater 122. A high nitrogen content waste stream 126 containing oxygen depleted retentate gas and combustion products may either be further processed to recoup the nitrogen or disposed as waste.

Anode effluent gas 54 that is a mixture of the sweep gas, predominantly steam, and oxygen product, is cooled in recuperative heat exchanger 128. Following separation of the steam and water, such as by means of condenser 60 and separator 62, oxygen product gas 48 is recovered.

Figure 8:
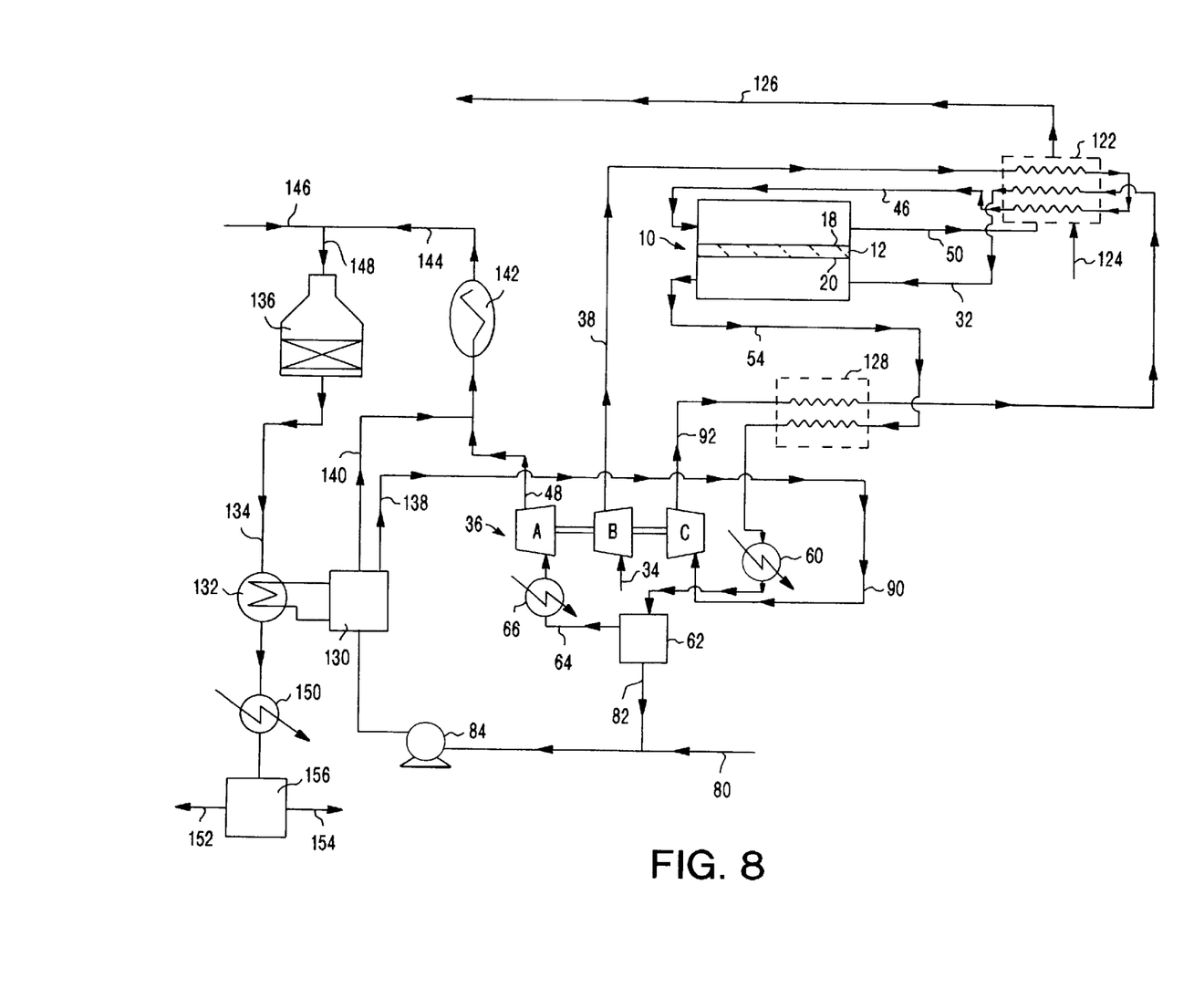
FIG. 8 is a process flow diagram in accordance with a third embodiment of the invention.

FIG. 8 illustrates an alternative system to utilize the method of the invention. A number of the components in FIG. 8 have been previously described with reference to either FIGS. 5 or 7 and those components are identified by like reference numerals but not particularly described again with reference to FIG. 8.

The figure shows more detail on the integration of the oxygen separator process with an autothermal reactor and also integrates the sweep gas generation with a Rankine cycle steam turbine.

In FIG. 8 superheated steam is generated in waste heat boiler 132 at an elevated pressure and collects in steam drum 130. The required heat for steam generation is provided by the sensible heat contained in hot reactor product effluent stream 134. From steam drum 130, a first portion 140 of the generated superheated steam flows to the autothermal reactor 136 and a second portion 138 is directed to a Rankine cycle steam turbine 36C which may consist of one or several stages. The inlet conditions (pressure, temperature and flow rate) to the turbine are selected to enable it to generate sufficient power to drive the air compressor 36B, the oxygen compressor 36A or both machines. optionally if a multistage machine is used, reheat may be applied between stages to generate additional power.

Superheated steam 90 drives steam turbine 36. Turbine exhaust 92 is at a pressure of from about 10 psia to about 30 psia and preferably at a pressure of from about 15 psia to about 22 psia. Turbine exhaust 92 is heated to an intermediate temperature in recuperative heat exchanger 40 and to an operating temperature of about 800° to 1000° C. in fired heater 122. Alternately an in-line combustor such as combustor 72 of FIG. 5 can be used in place of fired heater 122. Resultant high temperature steam 32 is used to sweep the anode 20 of membrane reactor 10. The resultant effluent oxygen-steam mixture 54 is cooled in heat exchanger 128 and the contained steam condensed in condenser 60 and removed in separator 62. The oxygen exiting separator 62 is further cooled in cooler 66, compressed in oxygen compressor 36A, and blended with steam 140. Optionally the combined stream is further heated in heater 142 and as stream 148 injected into autothermal reformer 136. The condensate stream 82 from separator 62 is combined with make-up water 80 and returned to steam drum 130 via pump 84. The product stream 134 from autothermal reformer 136 gives up a major portion of sensible heat in waste heat boiler 132. Then the contained steam is condensed in condenser 150 and the resulting water separated in separator 156. Stream 152 constitutes the raw syngas product ready for further post treatment and process condensate stream 154 which optionally can be recycled to steam drum 130 after further treatment.

Since the reactor pressures are typically high (200 to 600 psia), the condensing steam temperature in condenser 150 is sufficiently high to generate steam at an intermediate pressure. Steam thus generated could join the exhaust of a first stage of steam turbine 36C to be expanded in a second stage to generate additional power. Alternately the steam thus generated could be expanded in a separate steam turbine which could expand into the vacuum range since its exhaust pressure is independent of the anode side pressure and is only limited by available cooling sources. Such an independent turbine would generate more power and alternately could be used to drive at least one of the air compressor or the oxygen compressor.

In the process flow sheets (FIGS. 5, 7 and 8) many minor process units such as boiler feed water deaerators, feed water heaters and economizers are not shown to maintain clarity.

Syngas is a mixture of hydrogen and carbon monoxide with a $H_2/CO$ molar ratio of from about 0.6 to about 6. The conversion of methane to syngas may be by the oxidation reaction:

$$CH_4 + \tfrac{1}{2}O_2 \rightarrow CO + 2H_2$$

and/or the steam reforming reaction:

$$CH_4 + H_2O \rightarrow CO + 3H_2.$$

This process has a relatively high yield of hydrogen gas producing 3 moles of hydrogen gas for each mole of carbon monoxide produced. The advantage of conducting the steam reforming reaction in an auto-thermal reformer is that it can approximately balance exothermic and endothermic reactions and be can readily adapted to generate syngas with hydrogen to carbon monoxide ratios between 1.8 and 2.4.

We claim:

1. A process to separate oxygen from an oxygen containing feed gas, comprising:

providing a first reactor housing an oxygen transport membrane that has a cathode side and an opposing anode side, said oxygen transport membrane at a temperature effective to enable the transport of oxygen ions from said cathode side to said anode side;

heating said oxygen containing feed gas and then contacting said cathode side with said heated oxygen containing feed gas, said oxygen containing feed gas being compressed to a pressure of from 20 psia to 100 psia prior to heating;

heating a sweep gas that is, by moles, predominantly steam and having a steam partial pressure of from 10 psia to 30 psia and contacting said anode side with said heated sweep gas;

recovering an anode effluent from said anode side that is a mixture of transported oxygen and steam wherein said heated sweep gas volume is regulated to maintain an anode effluent with a steam to oxygen molar ratio that is in excess of 1:1;

condensing said anode effluent and separating water therefrom to produce a substantially water free oxygen gas; and compressing said substantially water free oxygen gas for delivery to a second reactor and reacting with a carbon containing gas.

2. The process of claim 1 wherein said oxygen containing feed gas is heated in a first in-line combustor.

3. The process of claim 2 wherein said oxygen containing feed gas is compressed and pre-heated prior to delivery to said first in-line combustor.

4. The process of claim 3 wherein said oxygen containing feed gas is preheated in a recuperative heat exchanger to a temperature that is within 100° C. of an intended temperature.

5. The process of claim 4 wherein said intended temperature is between 800° C. and 1000° C.

6. The process of claim 2 wherein said first in-line combustor is fired with a mixture of a fuel and oxygen from said oxygen containing feed gas.

7. The process of claim 4 including the step of passing said anode effluent through said recuperative heat exchanger.

8. The process of claim 2 wherein said sweep gas is heated in a second in-line combustor that is fired with a mixture of oxygen and fuel.

9. The process of claim 2 wherein said sweep steam is generated using waste heat from said second reactor.

10. The process of claim 9 wherein said waste heat is the heat of condensation of steam contained in syngas effluent from said second reactor.

11. The process of claim 8 including selecting said oxygen containing feed gas to be air and said carbon containing fuel to be natural gas.

12. The process of claim 8 wherein said first combustor and said second combustor are both housed within said first reactor.

13. The process of claim 12 wherein said oxygen transport membrane is formed as a tube closed at one end.

14. The process of claim 13 including the step of flowing said sweep gas inside said oxygen transport membrane tube and flowing said oxygen containing feed gas outside said oxygen transport membrane.

15. The process of claim 1 wherein the oxygen containing feed gas and the sweep gas are heated to said temperature effective to enable transport of oxygen ions by fired heaters using the heat of reaction of fuel and oxygen contained in cathode side effluent.

16. The process of claim 1 wherein the sweep steam is taken from the exhaust of a Rankine Cycle steam turbine.

17. The process of claim 16 wherein inlet conditions to said steam turbine are selected so that sufficient power is generated by said steam turbine to drive at least one of an air compressor and an oxygen compressor.

18. The process of claim 17 wherein heat for generating steam for said steam turbine is provided by sensible heat contained in product effluent from said second reactor.

19. The process of claim 17 wherein the steam turbine has two or more stages.

20. The process of claim 19 wherein exhaust from said two or more stages is reheated to a superheated state.

21. The process of claim 18 wherein the heat of condensation of steam contained in said product effluent is used to generate steam at an intermediate pressure level.

22. The process of claim 21 wherein said steam at said intermediate pressure level is blended with exhaust from one steam expansion stage and expanded in a last stage of said steam turbine to generate additional power.

23. The process of claim 22 wherein steam generated at an elevated pressure level by the heat of condensation of steam contained in the product effluent is supplied to a steam turbine providing the power for driving at least one of said air compressor or said oxygen compressor.

24. A process to separate oxygen from an oxygen containing feed gas, comprising:

providing a first reactor housing an oxygen transport membrane that has a cathode side and an opposing anode side, said oxygen transport membrane at a temperature effective to enable the transport of oxygen ions from said cathode side to said anode side;

contacting said cathode side with said oxygen containing feed gas, said oxygen containing feed gas being compressed to a pressure of from 20 psia to 100 psia;

contacting said anode side with a sweep gas that is, by moles, predominantly steam with a steam partial pressure of from 10 psia to 30 psia;

recovering as anode effluent a mixture of transported oxygen and steam from said first reactor wherein said heated sweep gas volume is regulated to maintain said anode effluent with a steam to oxygen molar ratio that is in excess of 1:1;

transporting at least a portion of said anode effluent to a second reactor effective to maintain both a partial oxidation reaction and a steam reforming reaction;

reacting at least said portion of said anode effluent with a carbon containing fuel; and recovering syngas from said second reactor.

25. The process of claim 24 wherein said reacting step includes both partial oxidation and steam reforming.

26. The process of claim 25 including selecting said second reactor to be an auto-thermal reformer.

27. The process of claim 26 wherein heat from said auto-thermal reformer is used to generate steam.

28. The process of claim 27 including heating said oxygen containing feed gas in a first combustor and said sweep gas in a second combustor before contacting said oxygen containing feed gas and said sweep gas with said oxygen transport membrane.

29. The process of claim 28 including the step of separating a portion of oxygen from a remainder of said anode effluent and firing said portion with a fuel in said second combustor.

30. The process of claim 29 including the step of heating water to steam in said second combustor and employing said formed steam as said sweep gas.

31. The process of claim 24 wherein said first combustor and said second combustor are both housed within said first reactor.

32. A process to separate oxygen from an oxygen containing feed gas, comprising:

providing a first reactor housing an oxygen transport membrane that has a cathode side and an opposing anode side, said oxygen transport membrane at a temperature effective to enable the transport of oxygen ions from said cathode side to said anode side;

heating said oxygen containing feed gas in a first combustor that is housed within said first reactor and then contacting said cathode side with said heated oxygen containing feed gas, said oxygen containing feed gas being compressed to a pressure of from 20 psia to 100 psia;

heating a sweep gas that is, by moles, predominantly steam and having a steam partial pressure of from 10 psia to 30 psia and contacting said anode side with said heated sweep gas; and recovering as anode effluent a mixture of transported oxygen and steam from said first reactor wherein said heated sweep gas volume is regulated to maintain an anode effluent with a steam to oxygen molar ratio that is in excess of 2:1.

33. The process of claim 32 wherein said oxygen containing feed gas is compressed and pre-heated prior to entering said first combustor.

34. The process of claim 33 including pre-heating said oxygen containing feed gas in a recuperative heat exchanger to a temperature that is within 100° C. of an intended temperature of said oxygen containing feed gas on exit of said first combustor.

35. The process of claim 34 including the step of passing said anode effluent through said recuperative heat exchanger.

36. The process of claim 35 including the step of separating a portion of oxygen from a remainder of said anode effluent and firing said portion with a fuel in said second combustor.

37. The process of claim 36 including the step of reacting said remainder with a carbon containing fuel in a second reactor and recovering syngas from said second reactor.

38. The process of claim 37 wherein said second combustor is also housed within said first reactor.

* * * * *